US008248196B2

(12) United States Patent
Bugiel et al.

(10) Patent No.: US 8,248,196 B2
(45) Date of Patent: Aug. 21, 2012

(54) MAGNET ARRANGEMENT FOR MAGNETIC LEVITATION VEHICLES AND METHOD FOR THE PRODUCTION THEREOF

(75) Inventors: Peter Bugiel, Fuldabrück (DE); Harald Pfannkuch, Wabern (DE); Wolfgang Hahn, Kassel (DE); Joachim Krämer, Zierenberg (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 298 days.

(21) Appl. No.: 12/442,795

(22) PCT Filed: Aug. 20, 2007

(86) PCT No.: PCT/DE2007/001506
§ 371 (c)(1),
(2), (4) Date: Mar. 25, 2009

(87) PCT Pub. No.: WO2008/043322
PCT Pub. Date: Apr. 17, 2008

(65) Prior Publication Data
US 2010/0026433 A1 Feb. 4, 2010

(30) Foreign Application Priority Data
Sep. 26, 2006 (DE) .................. 10 2006 045 950

(51) Int. Cl.
*H01F 1/00* (2006.01)
*H01F 3/00* (2006.01)
*H01F 7/00* (2006.01)
*B60L 13/04* (2006.01)

(52) U.S. Cl. ........ 335/296; 335/297; 335/298; 335/299; 335/302; 335/306; 104/281; 104/283

(58) Field of Classification Search .......... 335/296–299, 335/301–306; 104/281–286; 198/619, 805; 414/749.2
See application file for complete search history.

(56) References Cited

U.S. PATENT DOCUMENTS

| 3,710,291 | A * | 1/1973 | Nicoud ........................ 335/306 |
| 4,507,635 | A * | 3/1985 | Cardone et al. ............... 335/291 |
| 4,636,667 | A * | 1/1987 | Holzinger et al. ............. 310/13 |
| 4,842,086 | A * | 6/1989 | Michna ........................ 180/9.1 |
| 6,361,268 | B1 | 3/2002 | Pelrine et al. |
| 7,432,791 | B2 * | 10/2008 | Hahn et al. .................... 335/296 |
| 7,806,056 | B2 * | 10/2010 | Schmid et al. ................ 104/286 |
| 2001/0002507 | A1 * | 6/2001 | Miller et al. ................... 29/596 |
| 2004/0262131 | A1 * | 12/2004 | Forster et al. ................. 198/805 |
| 2006/0011093 | A1 * | 1/2006 | Jensen et al. ................. 104/282 |
| 2007/0169661 | A1 * | 7/2007 | Hahn et al. .................... 104/281 |
| 2007/0169662 | A1 * | 7/2007 | Ellmann et al. .............. 104/282 |
| 2008/0257197 | A1 * | 10/2008 | Hahn et al. .................... 104/282 |

FOREIGN PATENT DOCUMENTS

| DE | 102004012746 | 10/2005 |
| WO | WO 2005/090116 | 9/2005 |

* cited by examiner

*Primary Examiner* — Mohamad Musleh
(74) *Attorney, Agent, or Firm* — McGlew and Tuttle, P.C.

(57) ABSTRACT

The invention relates to a magnet arrangement for magnetic levitation vehicles. Said arrangement comprises a magnetic back box and a plurality of magnetic poles that are connected to said back box and that have magnetic pole faces bordering on a common reference surface. According to the invention, the reference surface extends along an elastic line when the magnetic pole is in the unloaded state, said elastic line being inverse to the curvature of the surface that is obtained under a nominal load of the magnetic poles when the magnetic pole faces are in the unloaded state on a plane. The invention also relates to a method for producing said type of magnet arrangement.

19 Claims, 8 Drawing Sheets

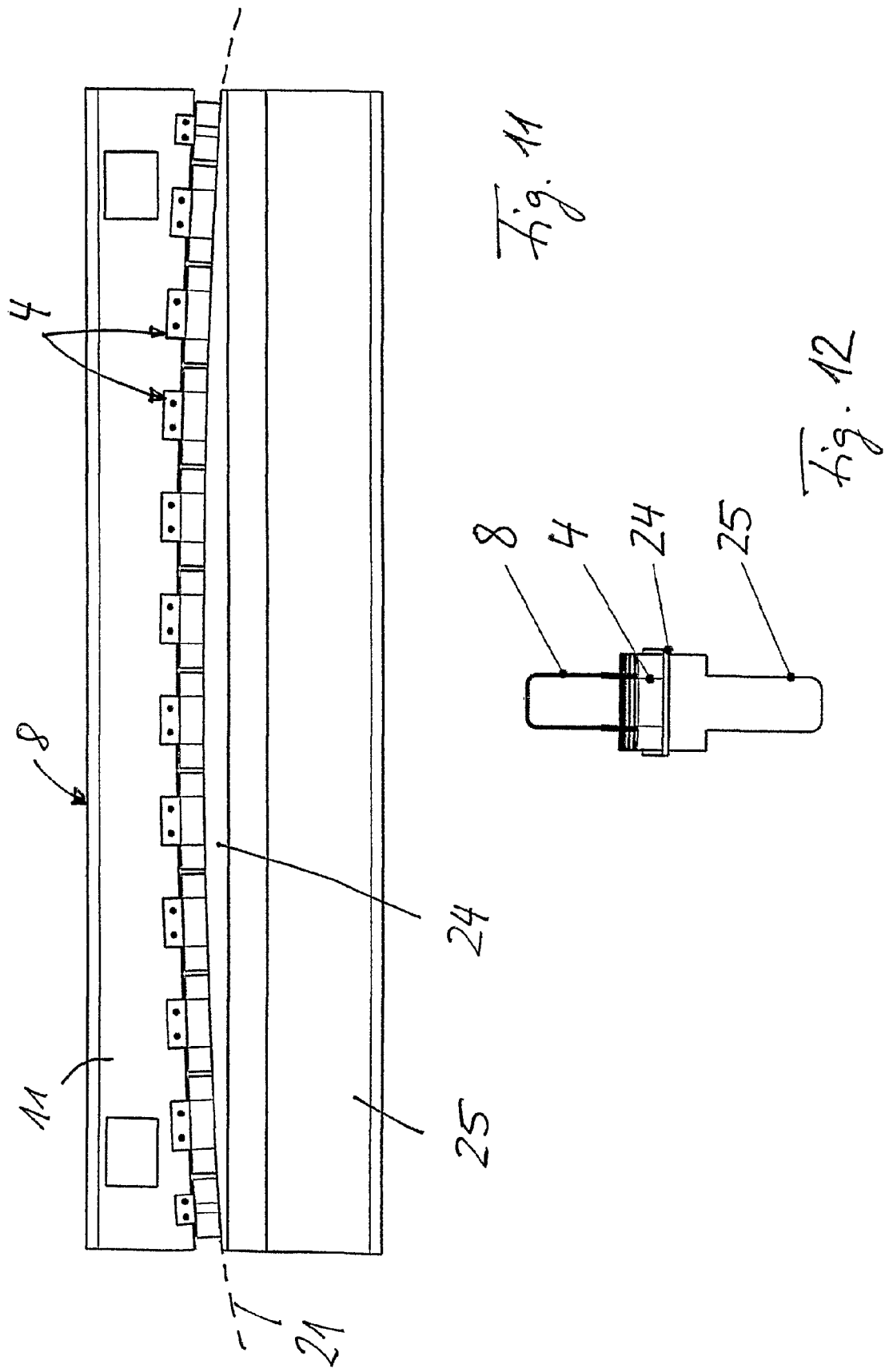

MAGNET ARRANGEMENT FOR MAGNETIC LEVITATION VEHICLES AND METHOD FOR THE PRODUCTION THEREOF

CROSS REFERENCE TO RELATED APPLICATIONS

This application is a United States National Phase application of International Application PCT/DE2007/001506 and claims the benefit of priority under 35 U.S.C. §119 of German Patent Application DE 10 2006 045 950.4 filed Sep. 26, 2006, the entire contents of which are incorporated herein by reference.

FIELD OF THE INVENTION

The invention relates to a magnet arrangement for magnetic levitation vehicles, comprised of a magnet back box and a plurality of magnetic poles firmly connected to it and arranged one behind the other, said magnetic poles having magnetic pole faces bordering on a common reference surface. The invention further relates to a method for the production of a magnet arrangement for magnetic levitation vehicles.

BACKGROUND OF THE INVENTION

A prior art magnet arrangement of this kind (e.g. DE 10 2004 012 746 A1) is comprised of a plurality of magnetic poles which in the direction of ride of a magnetic levitation vehicle are arranged one behind the other and fastened at and/or in a so-called magnet back box. With a magnet arrangement for carrying magnets, for example, there are twelve magnetic poles arranged one behind the other, although this number is arbitrarily chosen and may be greater or smaller, respectively. Each magnetic pole is comprised of a core defining a magnetic pole face and of a winding surrounding it which during operation of a magnetic levitation vehicle is passed through by a pre-selected current. The magnet back box is connected by means of two rack stirrups attacking at it via a suspended rack or the like to a wagon box of the magnetic levitation vehicle, with the rack stirrups for example attacking at the site of the second and eleventh magnetic pole at the magnet back box.

When serving the "carrying" function, the magnet arrangement serves the task of pulling the magnetic levitation vehicle during operation to a reaction rail mounted at the guideway in form of a longstator or the like and/or to maintain an air gap of 10 mm, for example, between the reaction rail and the magnetic pole faces through which the magnetic levitation vehicle is kept in a levitated state. For this purpose, in the levitated state, the preferably planar magnetic pole faces on the one hand entirely border at a common reference surface which is essentially parallel to the planar underside of the reaction rail and which is also designated as air gap surface. On the other hand, the current flowing through the windings of the magnetic poles is so controlled by the aid of control circuits and gap sensors connected to them and provided at both ends of the magnet arrangement that the magnitude of the gap between the underside of the reaction rail and the reference surface essentially remains constant everywhere.

Corresponding situations might occur with magnet arrangements which serve the function of "carrying" and which, for example, co-act with reaction rails in form of lateral guiding rails.

On account of the arrangement described, the back box and the reference surface, too, are bent under load along an elastic line which has the largest amplitude in the center of the magnet arrangement. Consequently, the magnitude of the air gap in central areas of the magnet arrangement is diminished and the magnet force is increased, while inversely at the ends of the magnet arrangement an enhancement of the air gap and a reduction in the carrying force are obtained. This results in different air gap portions which takes an adverse effect on the operating characteristics of the magnet windings, for example an increased power demand and a greater warming-up of the magnetic poles resulting thereof.

SUMMARY OF THE INVENTION

Now, therefore, the technical problem to be solved by the present invention is configuring the magnet arrangement of the afore-mentioned species in such a manner that the reference surface formed by the magnetic poles essentially evidences no curvature at least under nominal load, but forms a plane, and on the other hand indicating a comparably easy to implement method for the production of such a magnet arrangement.

According to the present invention, the magnet arrangement and/or the reference surface defined by its magnetic poles has such an inverse curvature in unloaded state that it is bent mainly to one plane at nominal load. Thereby it is possible to obtain an essentially constant air gap magnitude and thus equal magnet forces along the entire magnet arrangement during operation of the magnetic levitation vehicle. Moreover, the inventive method enables a particularly simple assembly of the magnetic poles with the magnet back box. Accordingly, it does not matter whether the magnet arrangement is to serve the function of "carrying" or "guiding".

The invention is explained in greater detail below in conjunction with the attached drawings and in different scales by way of an example of an embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 11 is a front view showing the parts according to FIG. 10 in a joined state; and FIG. 12 is a front view of the arrangement according to FIG. 11.

DESCRIPTION OF THE PREFERRED EMBODIMENTS

Figure 1:
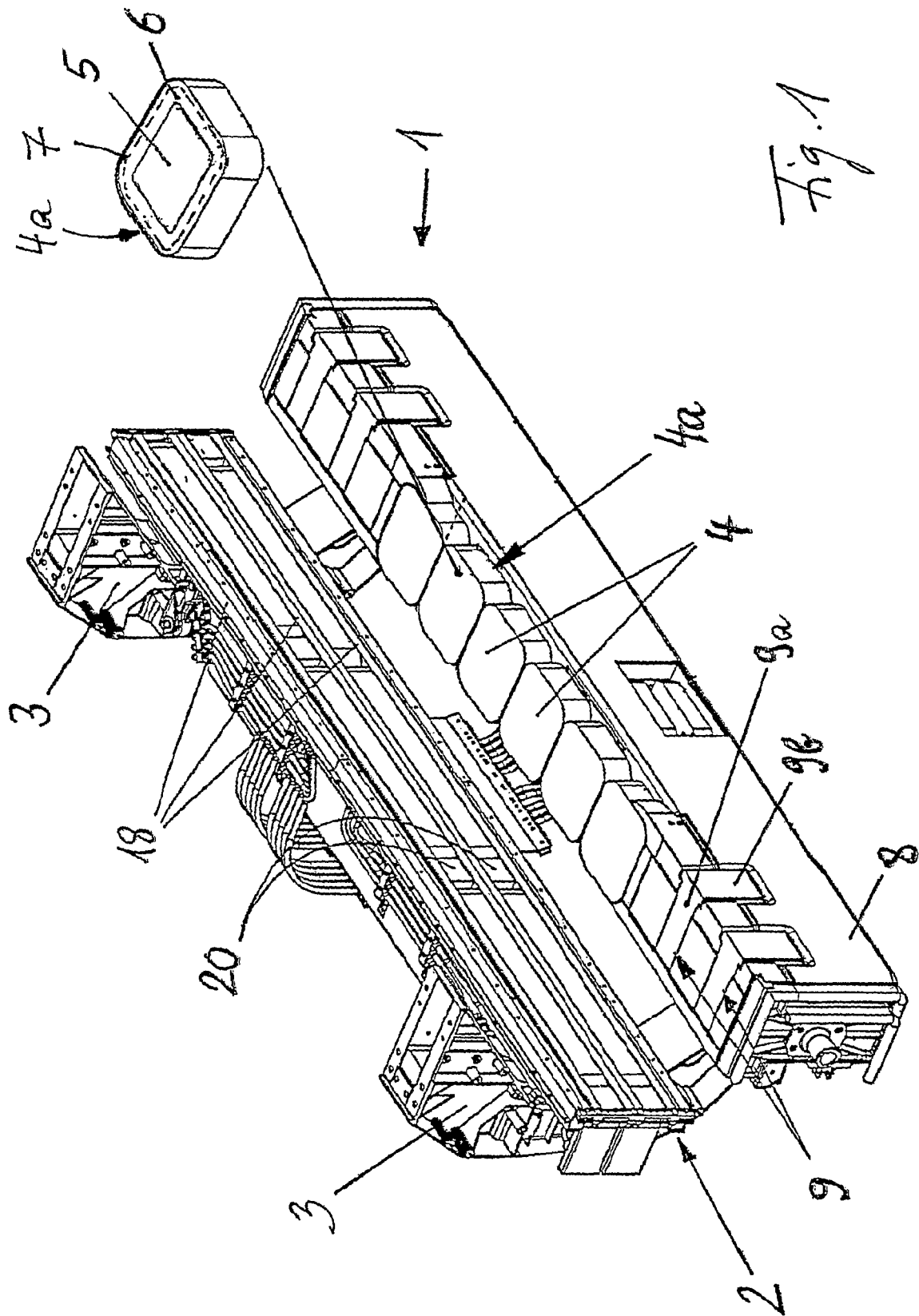
FIG. 1 is a schematic and perspective representation of a prior art module of a magnetic levitation vehicle, said module comprised of two magnet arrangements.

Referring to the drawings in particular, FIG. 1 schematically shows a module used with magnetic levitation vehicles, said module comprised of a first magnet arrangement 1 in form of carrying magnets and a second magnet arrangement 2 in form of guiding magnets. The module is fastened to rack stirrups 3 which in an actually known manner are connected to a suspended rack or the like of a wagon box of the magnetic levitation vehicle.

In the exemplary embodiment, the magnet arrangement 1 for the "carrying" function comprises twelve magnetic poles 4 arranged one behind the other with cores 5 and windings 6 electrically connected in series as shown in an enhanced view in FIG. 1 for a magnetic pole 4a. The magnetic poles 4 are usually surrounded all around by an anti-corrosion layer 7 comprised of epoxy resin, for example. The cores 5 are firmly connected among each other by pole backs not visible in FIG. 1 and by pole cheeks not visible either to a magnet back box 8.

At least one sensor 9 with a sensor head 9a and an electronic module 9b serves to control the flow of current through the windings 6 in such a manner that the magnitude of an air gap between magnetic poles 4 and a reaction rail not shown here, for example a longstator, remains constant during operation of a magnetic levitation vehicle. The sensor head 9a serves to determine the actual value of the air gap magnitude, while the electronic module 9b connected to it to generate, process and/or evaluate sensor signals is mainly comprised of certain switching circuits and connected to a control element which serves to control the current through the windings 6 in such a manner that the gap magnitude assumes and maintains a pre-selected design value.

Figure 2:
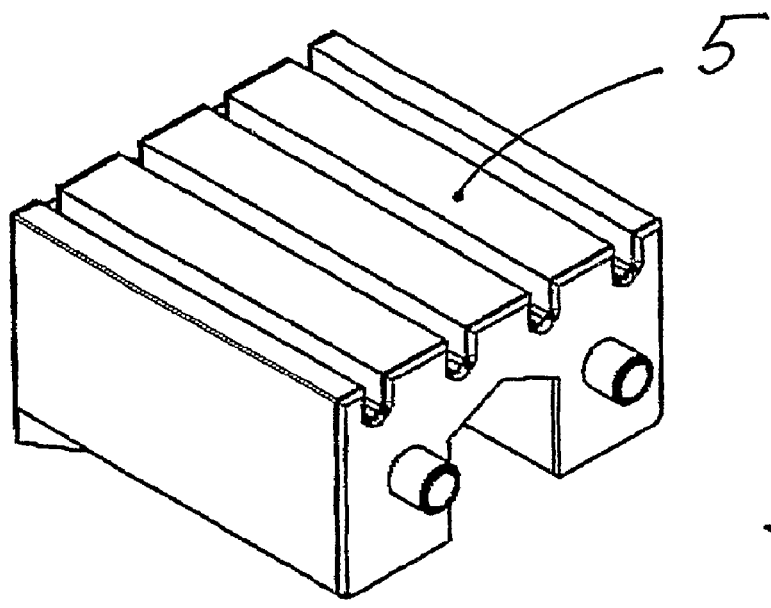
FIG. 2 is a perspective view of a core of a single magnet of the magnet arrangement according to FIG. 1.
Figure 3:
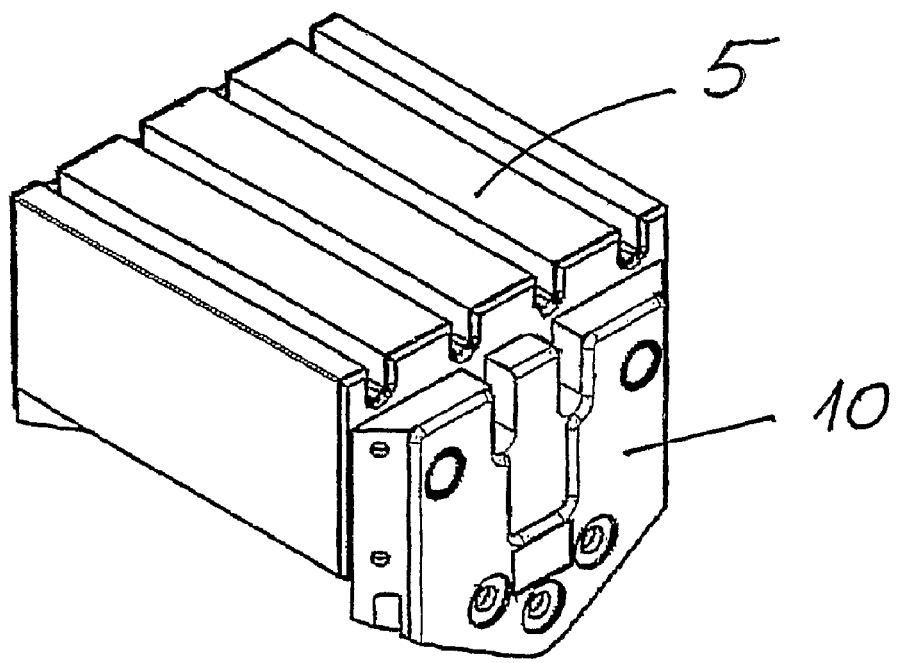
FIG. 3 is a view of the core according to FIG. 2 after attachment of a pole cheek at the core.
Figure 4:
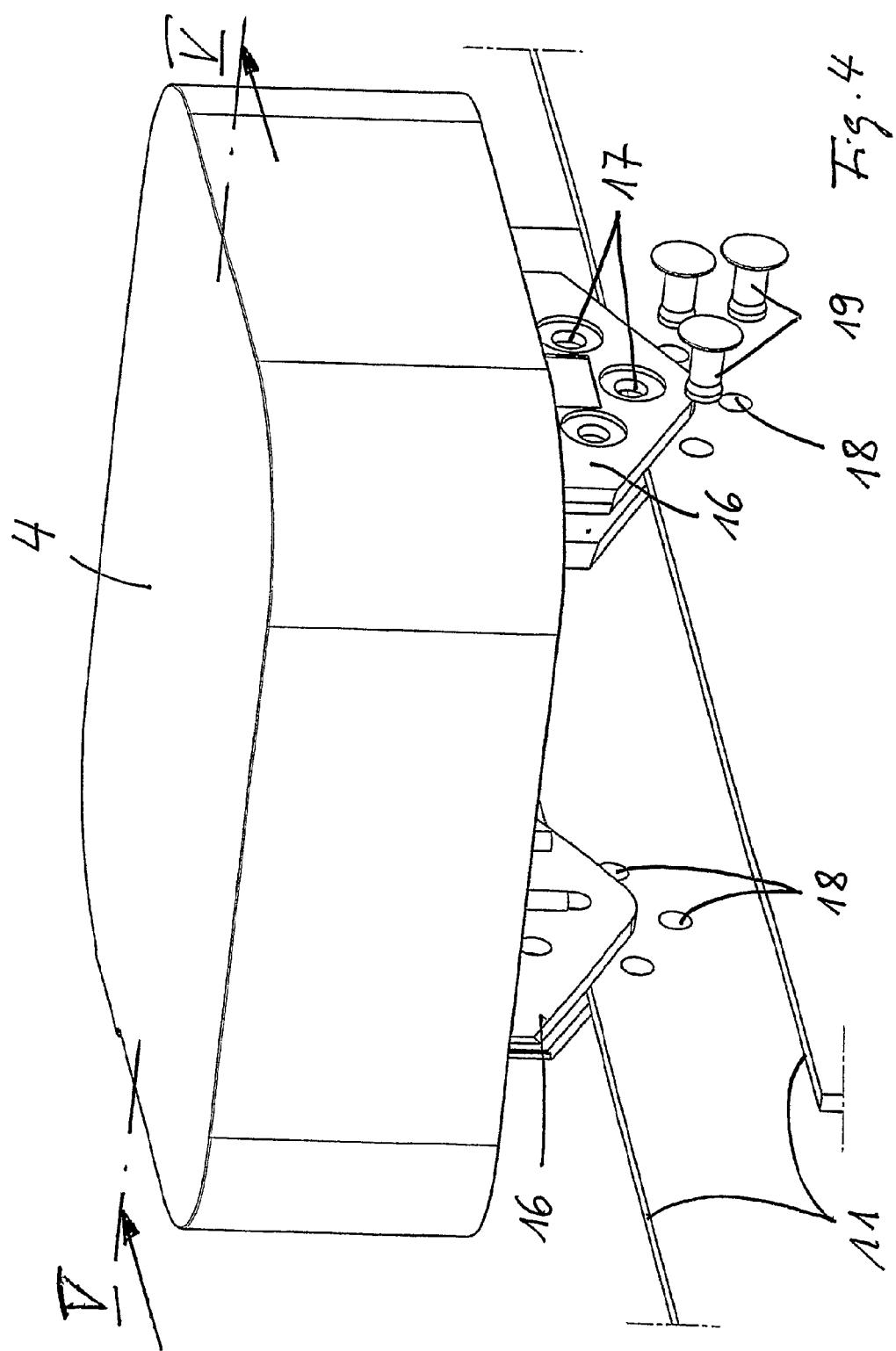
FIG. 4 is a complete magnetic pole having the core according to FIGS. 2 and 3 of the magnet arrangement according to FIG. 1 and a magnet back box serving for its mounting and showing features according to the invention.
Figure 5:
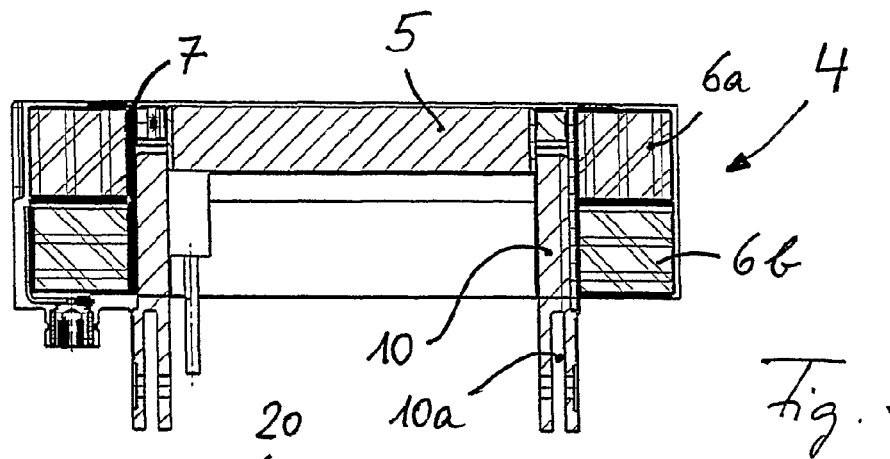
FIG. 5 is a sectional view along the line V-V of FIG. 4.

The cores 5 (FIGS. 1 to 3) are configured and manufactured in an actually known manner (e.g. DE 197 03 497 A1) and provided at least at one side with a pole cheek 10 destined for its fastening to the magnet back box 8. Preferably one pole cheek 10 each is mounted both on the front side and on the back side of cores 5. In a finished state after having been provided with the anti-corrosion layer 7, a magnetic pole provided with the core 5 has the appearance according to FIGS. 4 and 5, indicatively show in FIG. 5 that the winding 6 is preferably comprised of two disks 6a and 6b (e.g. DE 10 2004 011 940 A1). Moreover, it becomes evident from FIGS. 4 and 5 that the pole cheeks 10 only project slightly towards the bottom beyond the cores 5 and that these slight projections each are provided with grooves 10a. Further details evident from FIGS. 2 to 5 of the magnetic poles 4 are of no essential nature for the present invention, so that their description is dispensed with.

Figure 6:
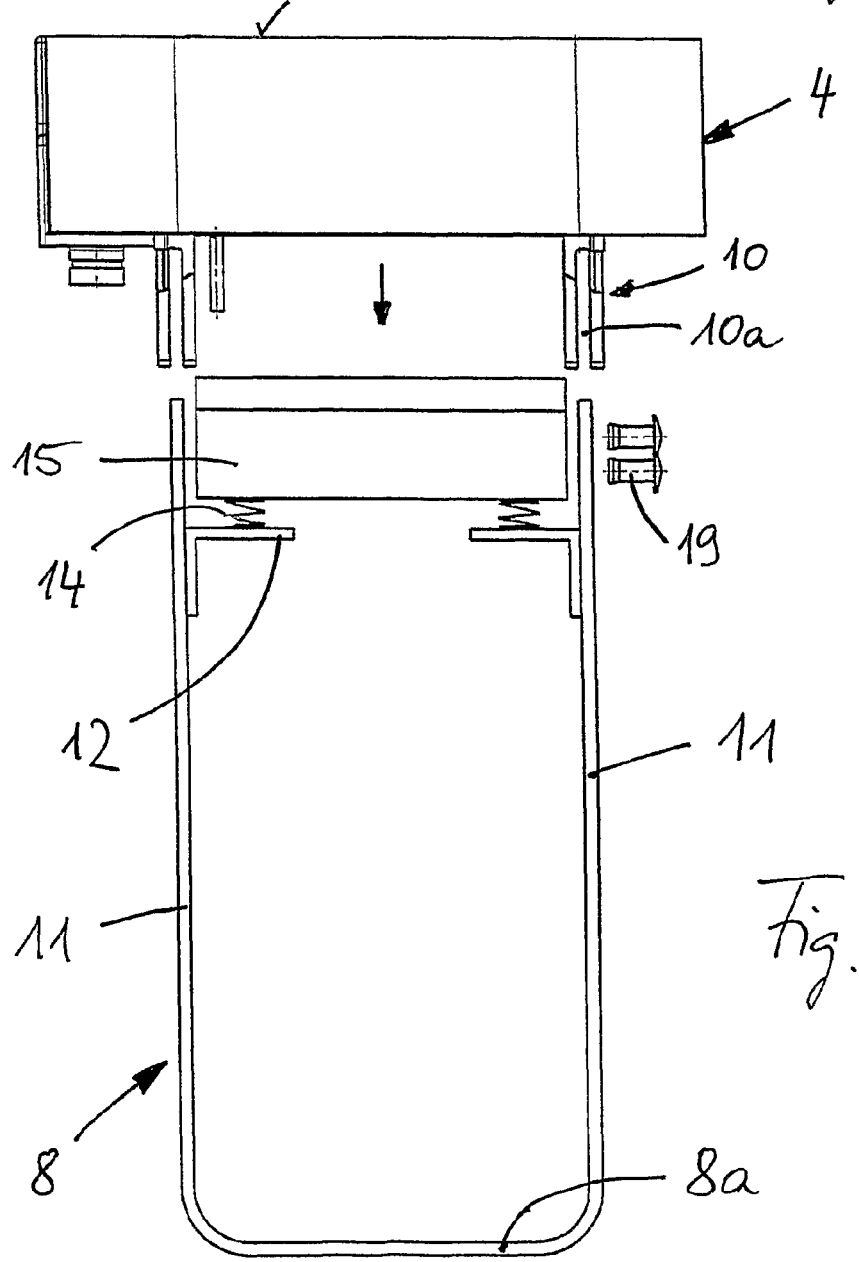
FIG. 6 is a schematic cross-sectional view through a magnet back box and a magnetic pole to be mounted on it, shown in a front view shown in one of different positions during the assembly.
Figure 7:
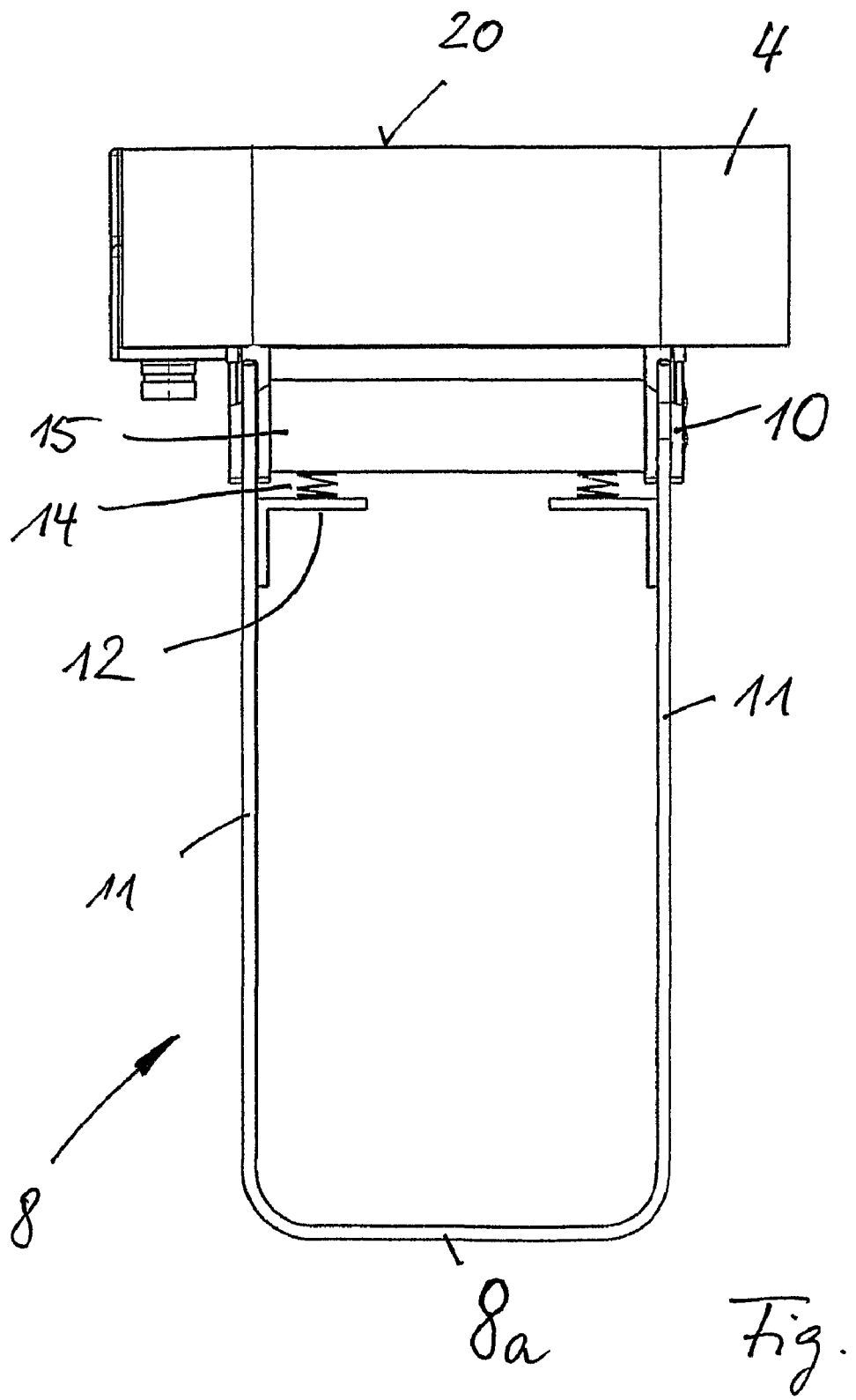
FIG. 7 is a schematic cross-sectional view through a magnet back box and a magnetic pole to be mounted on it, shown in a front view in another of different positions during the assembly.
Figure 8:
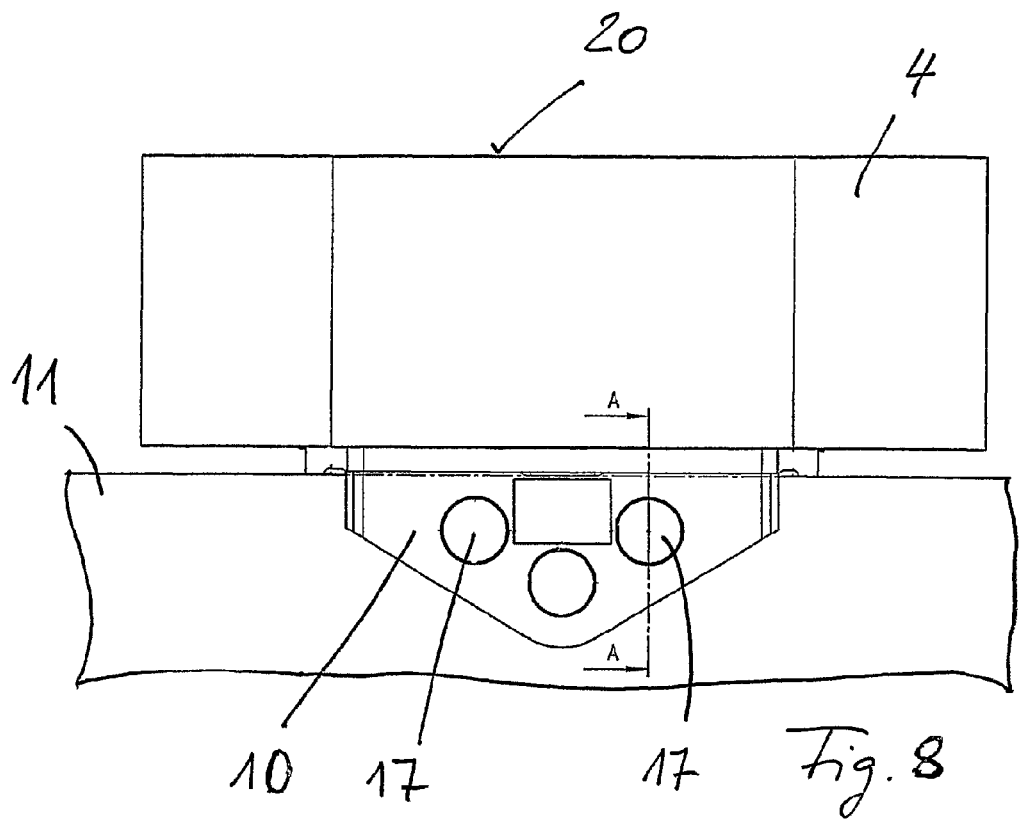
FIG. 8 is a side view of the magnetic pole according to FIG. 4.
Figure 9:
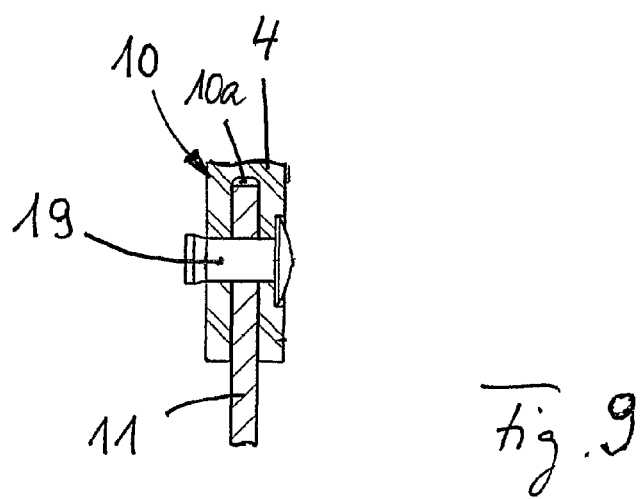
FIG. 9 is an enlarged section along the line A-A of FIG. 8.

FIGS. 6 and 7 show that the magnet back box 8 usually has a U-shape and a bottom 8a as well as two walls 11 rising up from it vertically. The walls 11 are provided with one holder 12 each extending inwardly in an area remote from bottom 8a. These holders 12 serve to support the springs 12 which in turn serve to give resilient support to pole backs 15 which magnetically connect the individual magnetic poles 4 with each other at their undersides and which come to rest between both walls 11.

The grooves 10a of pole cheeks 10 have a width which mainly corresponds to the thickness of walls 11 of magnet back box 8, while the two pole cheeks 10 of each core 5 are spaced by a measure mainly corresponding to the distance of the side walls 11. Therefore, if a magnetic pole 4 as shown in FIG. 6 is approached from the top in the direction of the drawn arrow to the upwardly open U-shaped magnet back box 8, then the top edges of walls 11 enter into the grooves 10a of pole cheeks 10 of an assigned pair of pole cheeks 10 (FIG. 7).

In accordance with the invention as shown in FIGS. 4 to 9, a precise alignment and/or positioning of magnetic poles 4 towards the magnet back box 8 is achieved by the aid of fasteners with a magnet portion or first positioning means 17 configured at magnetic poles 4 and/or their pole cheeks 10 and with a back box portion or second positioning means 18 assigned to them and provided at the upper edges of walls 11. In the exemplary embodiment, the first positioning means 17 comprise first holes and/or bores configured in pole cheeks 10 while the second positioning means 18 are comprised of second holes and/or bores configured in walls 11, as is more particularly shown in FIGS. 4 and 8. The fastening of magnetic poles 4 to the walls 11 in the positions defined by the positioning means 17, 18 is preferably accomplished by the aid of fastening elements 19 (FIG. 9) in form of pins such as rivets or bolts, or other suitable fastening means that project through the first and second holes 17 and 18. It would also be conceivable to insert fitting pins into holes 17, 18 which merely serve for positioning and to accomplish the fastening of magnetic poles 4 to the magnet back box 8 in a different manner.

The position of the positioning means 17, 18 is so chosen that the magnetic poles 4 when being in their state fastened to the magnet back box 8 (FIG. 7) rest from the top on the pole cheeks 15 previously supported on springs 14. Therefore, in their built-in state (FIG. 7), they are firmly pressed against the cores 5 of magnetic poles 4 without this requiring any further measures.

With prior art magnet arrangements of the species described herein, usually planar magnetic pole faces 20 (FIGS. 6, 7) defined by magnetic poles 4 entirely border at a common reference plane which in ready-to-ride state of the magnetic levitation vehicle lies opposite to an also planar area, which for example is configured at the underside of a longstator mounted in the guideway of the magnetic levitation vehicle and composed of individual stator packets, being part of a longstator linear motor effecting the propulsion of the magnetic levitation vehicle. If it is intended to establish the levitation state of the magnetic levitation vehicle, the magnetic poles 4 are activated, thereby lifting the magnet back box 8 and—via the rack stirrups 3 (FIG. 1)—the entire magnetic levitation vehicle until a defined air gap is established between the reference surface and the underside of the reaction rail.

The line load developed by the levitation state involves a flexure of the magnet back box 8 between rack stirrups 3 like a bending beam, thus causing a curvature of the reference surface along an elastic line, entailing the problems outlined hereinabove.

According to the present invention, it is therefore proposed to provide the reference surface in unloaded state, i.e. more particularly with no-current magnetic poles 4, a curvature which mainly is oppositely equal and/or inverse to the curvature of an area which is configured at nominal load if the magnetic pole faces 20 in unloaded state entirely lie in one plane. Thereby it is achieved that the bending of magnet back box 8 resulting at nominal load and/or with switched-on magnetic poles 4 mainly compensates the preformed elastic line existing in unloaded state and thus at nominal load leads to a mainly planar reference surface and to gap sizes that are equal everywhere.

Figure 10:
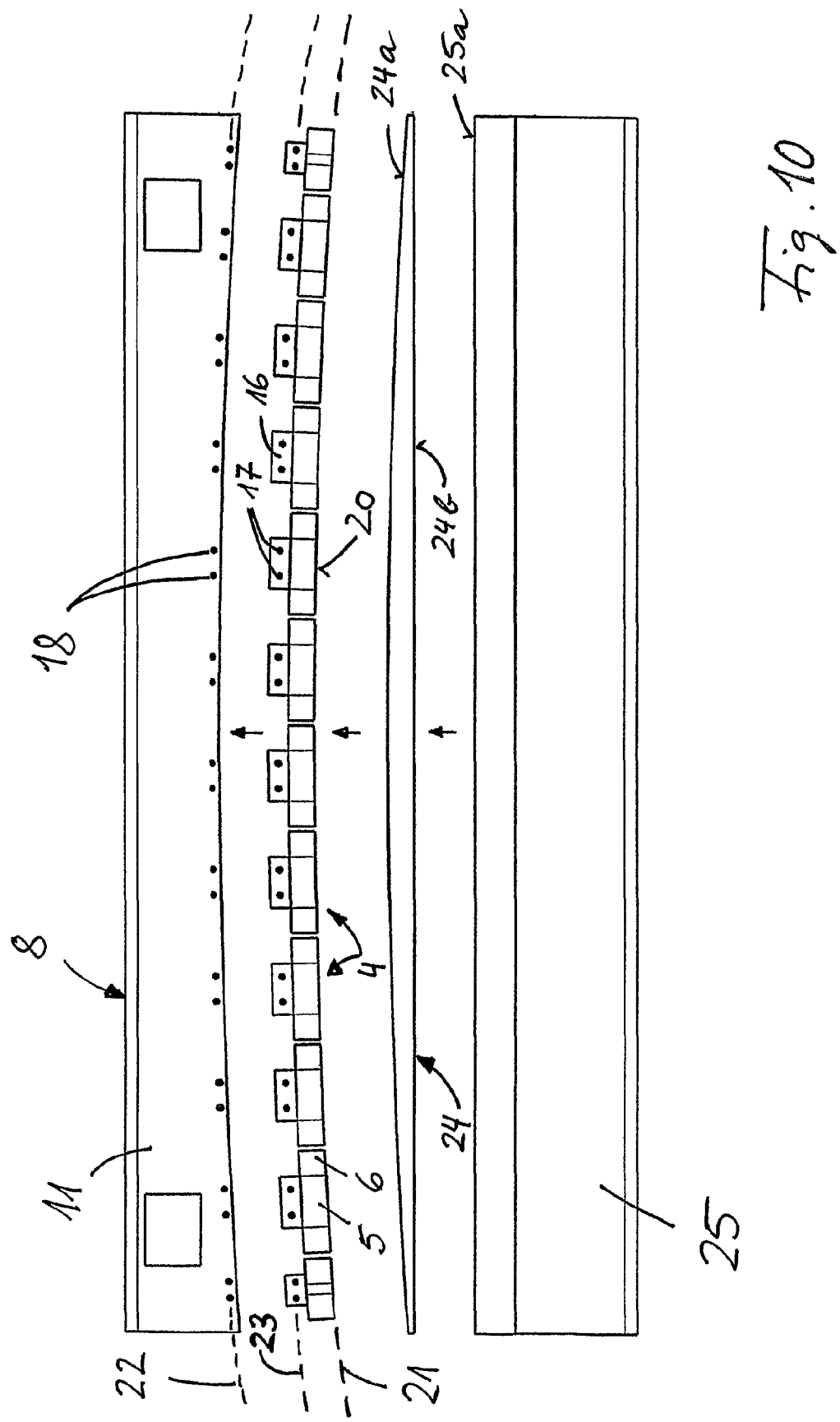
FIG. 10 is a schematic side view and in a stretched view showing a magnet back box, a plurality of magnetic poles and equipment components destined for their assembly.

The described, pre-bent status of the reference surface which is indicatively shown in dashed lines in FIG. 10 and designated with reference number 21 can be induced by various means, e.g. by appropriate perforated patterns in the pole cheeks 10 of magnetic poles 4. But since it is expedient for reasons related to manufacturing techniques to configure all magnetic poles and, more particularly, the perforated patterns in the pole cheeks 10 identically, it is furthermore proposed under the present invention to configure the inverse elastic line 21 in the magnet back boxes 8. This is schematically indicated by a line 22 shown in dashed style and extending through the center axes of the second holes 18, wherein the magnet back box 8 like in FIG. 11 in contrast with FIGS. 6 and 7 is arranged at top while the magnet arrangement with the magnetic poles 4 is arranged at bottom. If all the holes 17 in pole cheeks 16 have the same position, the consequence will be that the holes 17 in their built-in state lie on a line 23 which runs in parallel to line 22 so that the magnetic pole faces 20 border like a polygon curve on the reference surface 21 which has a curvature corresponding to lines 22, 23.

The manufacture of the magnet back boxes 8 is not rendered more difficult by the present invention. According to the invention, not only all magnetic poles 4 but also all magnet back boxes 8—viewed in the direction of ride of the magnetic levitation vehicle—can be identically configured, i.e. with all magnet back boxes 8 the pattern of holes 18 and/or the line 22 which they lie on can be of an equal configuration. Therefore, line 22 must be calculated merely once, whereupon the holes 18 can be drilled by the aid of computer-aided drillers or the like in such a manner that they lie on line 22 schematically indicated in FIG. 10 or on lines extending in parallel to it.

The assembly of the magnet arrangement to the magnet back box 8 could be executed by installing the magnetic poles 4 individually and consecutively in the manner that becomes evident from FIGS. 4 to 9. However, according to the invention, it is proposed to execute the assembly and mounting by the aid of the device that becomes evident from FIGS. 10 to 12.

As shown by FIG. 10, in particular, a plate 24 is utilized for the assembly of magnetic poles 4, said plate having a surface 24a which has a curvature inverse to the usually developing elastic line of the back box 8, thus having a curvature exactly like the elastic line 21. The magnetic poles 4 with their magnetic pole faces 20 are arranged along this surface 24a, as becomes evident from FIG. 11, in particular. The curvature of the surface 24a can easily be configured so that it follows an elastic line deemed ideal. Subsequently, the plate 24 and the magnet back box 8 which previously has been provided with the holes 18 extending along the elastic line 22 are approached to each other until the first and second holes 17, 18 are aligned to each other in pairs. Since the surface 24a of the plate 24 has the same curvature as the elastic line 21, the position of the magnetic poles 4 towards the magnet back box is clearly defined so that both of them can be firmly connected to each other by the aid of fastening means, e.g. bolts, protruding through holes 17, 18. The pole backs 15 (FIGS. 6, 7) lean by the aid of springs 14 resiliently each to the underside of cores 5 of magnetic poles 4 so that the bending of the reference surface 21 does not call for taking any additional measures for these pole backs 15.

The plate 24, for example, may be an originally planar-parallel plate consisting of a plastic material, whose surface 24a is produced on a CNC machine by the aid of a milling cutter.

In case that the first and second holes 17, 18 are not exactly concentrically aligned to each other due to tolerances in the position which becomes evident from FIGS. 11 and 12, then fastening means in form of bolts or the like with such small diameters are used, for example, so that these can be plugged through the holes 17, 18 if their axes are positioned in an arrangement slightly staggered to each other. By a sufficiently strong tightening of the bolts or the like, the pole cheeks 10 are then pressed so tightly against the wall 11 that due to the surface compression and adhesion friction resulting thereof there is no risk or danger that the magnetic poles 4 get shifted relatively to the magnet back box 8 when operating the magnetic levitation vehicle. This applies in particular if the bolts or the like are provided with conventional anti-twist security means. Besides, it gives the advantage that the position of the magnetic pole faces 20 and/or the position of the magnetic poles 4 relatively to the magnet back box 8 in this case is determined solely by the shape of the surface 24a of plate 24 rather than by the position of the positioning means and/or holes 17, 18. Thereby it is possible to compensate for misalignments caused by unavoidable tolerances in the production of magnet back boxes 8 and magnetic poles 4 which may account for up to 0.5 mm, for example. Such misalignments can therefore not lead any longer to substantial discrepancies of the magnetic pole faces 20 from the reference surface 21.

With a special advantage and according to the embodiment currently deemed to be best of the present invention, a combined positively locked and form-fit connection instead of the described predominantly positively locked connection is provided between the magnetic poles 4 and the magnet back boxes 8. For this purpose, rivets 19 (FIG. 9) are used, for example, which have a smaller diameter than the first and/or second holes 17, 18, but which additionally have "hole-face filling" properties. This term is understood to mean rivets which become soft when compressed and/or start flowing and penetrate into gaps, if any, existing between themselves and the hole bearing faces to fill these completely. Thus a form-fit connection is obtained in addition to the positively locked connection. It is of advantage if the walls 11 are mounted in the grooves 10a of the pole cheeks 10 (FIG. 9) or inversely if the pole cheeks 10 are mounted in the grooves of walls 11, because such a "bi-sectional" connection leads to a symmetrical load of rivets 19 or other fastening means and because there is no propensity for tilting.

Finally, FIG. 10 shows a preferred application of plate 24. To ensure that the magnetic poles maintain their defined position on the surface 24a while approaching to the magnet back box 8 or while the magnet back box 8 approaches the magnetic poles 4, the plate 24 with its underside 24b is preferably laid onto a tensioning means 25. For example, a tensioning magnet may serve as tensioning means 25, said tensioning magnet having a planar surface 25a, in the case of which the underside 24b of plate 24 expediently is also planar so that the plate 24 entirely has a mainly planar-convex shape. Moreover, the plate 24 in this case is expediently fabricated from a non-magnetic and/or ferromagnetic material.

The tensioning means 25 preferably extends over the entire length of plate 24 and magnet back box 8. In case of a tensioning magnet, conventional magnets provided with C-shaped cores can be utilized, for example magnets like those known from machine tool manufacture. Alternatively it would be possible to provide the tensioning magnet in the same manner with north and south poles alternating in longitudinal direction, which is also valid for the magnet arrangement to be produced. Besides, however, it is also possible to use hydraulic or pneumatic tensioning devices. Furthermore it would be conceivable to fasten the magnetic poles 4 simply on the convex surface 24a of plate 24 by sticking and/or gluing or to pull these through openings in plate 24 by the aid of suitable suctioning devices to the surface 24a.

The tensioning means 25 provided for in an individual case must merely be capable of maintaining the magnetic poles 4 in the desired position until they together with plate 24 lean to the magnet back box 8 (FIGS. 11, 12) and until the required fastening of the magnetic poles 4 to the magnet back box 8 has been performed.

After tightening of the relevant fastening means, the plate 24 is removed from the magnetic pole faces 20. These will then border on the reference surface 21 (FIG. 10) according to the afore-mentioned description, with the curvature of said reference surface being so chosen that it is bent in opposite direction during the subsequent application of the magnet arrangement in the sense of FIG. 1 under nominal load and thus becomes a planar surface. Besides, the described assembly technique bears the advantage that the positioning of magnetic poles 4 is virtually fixed only by the narrowly tolerable plate 24 so that tolerances in the magnet back box 8 and holes 17, 18 have no substantial influence on the exact bordering of the magnetic pole faces 20 to the reference surface 21.

The present invention is not restricted to the described example of the embodiment which could be varied in a plurality of ways. In particular this applies to the special configuration of the magnet back box 8, which for example needs to have only one wall 11, and to the means for connecting the magnetic poles 4 with the magnet back box 8. Furthermore, it is also possible to provide positioning and fastening means other than those described positioning and fastening means. In particular, for example, the magnetic poles 4 existing at both ends of the magnet arrangement can be provided with a lesser number of first positioning means 17, because these end poles in most cases have pole faces that are just half as big as the other magnetic poles 4. Accordingly, the magnet back box 8 may have less second positioning means 18 at the ends. Furthermore, it is obvious that the measures described with the function of "carrying" based on the magnet arrangement 1 (FIG. 1) could also be applied to the magnet arrangement 2 with the function of "guiding". Moreover, it is possible to configure the plate 24 as an integral part of the tensioning means 25, for example by providing the surface of a pole plate of a tensioning magnet with the curved surface 24a. Finally it is self-evident that the various features can also be applied in combinations other than those described and represented hereinabove.

While specific embodiments of the invention have been shown and described in detail to illustrate the application of the principles of the invention, it will be understood that the invention may be embodied otherwise without departing from such principles.

The invention claimed is:

1. A magnet arrangement for magnetic levitation vehicles, the magnet arrangement comprising:
   a magnet back box bending between a loaded state and an unloaded state; and
   a plurality of magnetic poles firmly connected to said magnet back box and arranged one behind the other, said magnetic poles having magnetic pole faces bordering on a common reference surface, the reference surface extending along a curved orientation comprising a shape of a bending line when the magnetic pole is in the unloaded state, said curved orientation being inverse to a planar surface that is obtained due to bending under a nominal load of the magnetic poles from when the magnetic pole faces are previously in the unloaded state on a plane.

2. A magnet arrangement as defined in claim 1, wherein the magnetic poles are provided with first positioning means and the magnet back box has second positioning means assigned to the first positioning means and arranged along a line extending in parallel to said bending line.

3. A magnet arrangement as defined in claim 2, wherein the first and second positioning means are comprised of first and second holes.

4. A magnet arrangement as defined in claim 3, wherein a fastening of the magnetic poles to the magnet back box is accomplished by rivets protruding through the first and second holes.

5. A magnet arrangement as defined in claim 4, wherein the rivets have smaller cross-sections than the first and/or second holes and that they have the property of completely filling gaps, if any, remaining between them and the hole bearing faces in the built-in state.

6. A magnet arrangement as defined in claim 3, wherein the magnet back box comprises a bottom and at least one wall rising-up from said magnet back box and provided with the second positioning means and the magnetic poles at least at the undersides averted from the magnetic pole faces have at least one pole cheek, each pole cheek accommodating a portion of the wall and provided with the first positioning means.

7. A method for the assembly of a magnet arrangement, the method comprising the steps of:
   providing a magnet back box;
   connecting a plurality of magnetic poles firmly to the magnet back box with the magnetic poles arranged one behind the other, the magnetic poles having magnetic pole faces bordering on a common reference surface, the reference surface extending along a curved orientation comprising a shape of an elastic line when the magnetic pole is in the unloaded state, the elastic line being inverse to the curvature of the surface that is obtained under a nominal load of the magnetic poles when the magnetic pole faces are in the unloaded state on a plane;
   providing the magnetic poles with first positioning means;
   providing the magnet back box with a second positioning means assigned to the first positioning means and arranged along a line extending in parallel to said elastic line;
   providing a plate having a surface curved according to the elastic line;
   laying the magnetic poles with their magnetic pole faces onto the curved surface of said plate;
   providing the wall with the second positioning means arranged along the line extending in parallel to said elastic line;
   moving the plate and the magnet back box towards each other until the first and second positioning means are aligned with each other;
   firmly connecting the magnetic poles with the wall and subsequently removing the plate from the magnetic poles.

8. A method as defined in claim 7, wherein the plate is configured as a part of a tensioning means.

9. A method as defined in claim 8, wherein the plate is configured as a separate component.

10. A method as defined in claim 9, wherein the tensioning means is provided with a planar surface, and the plate is provided with a planar surface and a curved surface averted from the planar surface and with the plate laid onto the planar surface of the tensioning means, and the magnetic poles before being approached to the magnet back box are laid onto the curved surface of the plate.

11. A method as defined in claim 8, wherein a tensioning magnet is utilized as tensioning means.

12. A method as defined in claim 11, wherein the plate is manufactured from a non-ferromagnetic material.

13. A method as defined in claim 8, wherein a hydraulic or pneumatic tensioning means is utilized.

14. A method as defined in claim 7, wherein rivets protruding through the first and second positioning means in the form of holes and having properties filling the hole bearing faces are utilized for fastening the magnetic poles at the wall.

15. A magnet arrangement for magnetic levitation vehicles riding on a rail, the magnet arrangement comprising:
a magnet back box with connections to one of the magnetic levitation vehicles, said back box flexing between an unloaded shape when the one magnetic levitation vehicle is unloaded, and a loaded shape when magnet back box supports the one magnetic levitation vehicle with a predetermined load, said unloaded shape being different than said loaded shape;
a plurality of magnetic poles connected to said magnet back box, each of said magnetic poles having a pole face arranged to face the rail, said plurality of magnetic poles being arranged on said magnetic back box in said unloaded shape to have said plurality of magnetic pole faces form a reference surface, said reference surface being shaped to arranged said plurality of magnetic pole faces in a plane when said magnet back box is in said loaded shape.

16. A magnet arrangement in accordance with claim 15, further comprising:
a plurality of fasteners, each of said fasteners connecting one of said plurality of magnetic poles to said magnet back box, said each fastener selectively positioning a respective said magnetic pole on said magnet back box.

17. A magnet arrangement in accordance with claim 16, wherein:
said each fastener includes a back box fastener portion arranged on said back box, and includes a magnet portion arranged on said respective magnetic pole, said back box fastener portions being arranged on said back box to follow a shape of said reference surface within a first tolerance, each of said magnet portions being spaced from a respective pole face by a constant distance in all of said plurality of magnetic poles within a second tolerance;
said each of said plurality of fasteners selectively positioning said respective said magnetic pole within said first and second tolerances.

18. A magnet arrangement in accordance with claim 17, wherein:
said each fastener defines a hole in one of said back box and said respective magnetic pole, said each fastener including a pin arranged in a respective said hole of a respective fastener, said each pin having a size smaller than said respective hole by said first and second tolerances.

19. A magnet arrangement in accordance with claim 1, wherein:
said reference surface is non planar when said magnet back box is in said unloaded shape.

* * * * *